Aug. 7, 1934.    J. A. SMITMANS    1,969,433
FLYING SHEAR
Filed Dec. 7, 1933    4 Sheets-Sheet 3
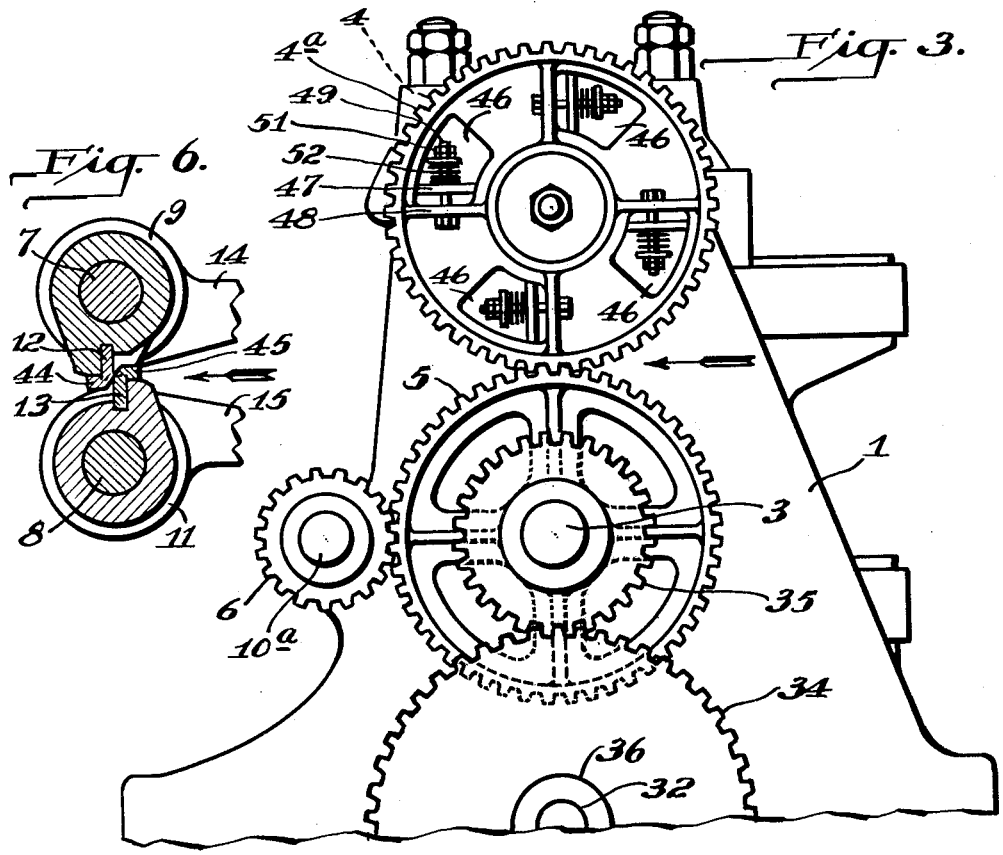
Fig. 3.
Fig. 6.
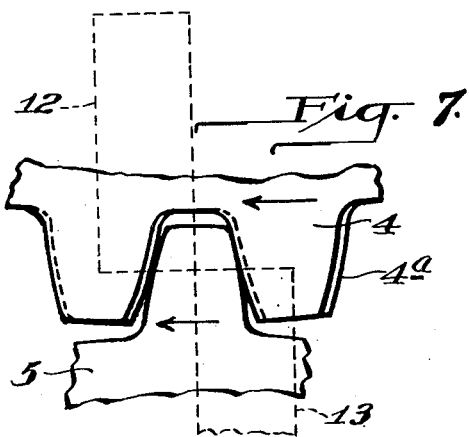
Fig. 7.
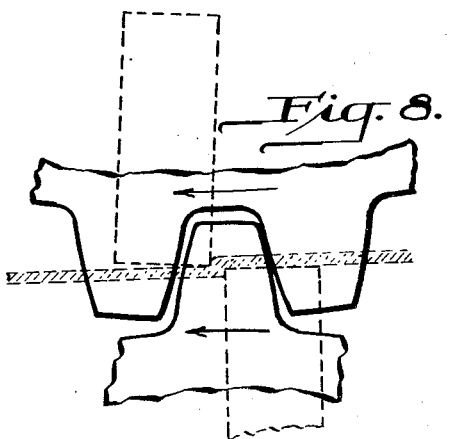
Fig. 8.
WITNESSES
A. B. Wallace.
J. E. Dickinson
INVENTOR
John A. Smitmans
by Brown, Critchlow, & Flick
his Attorneys

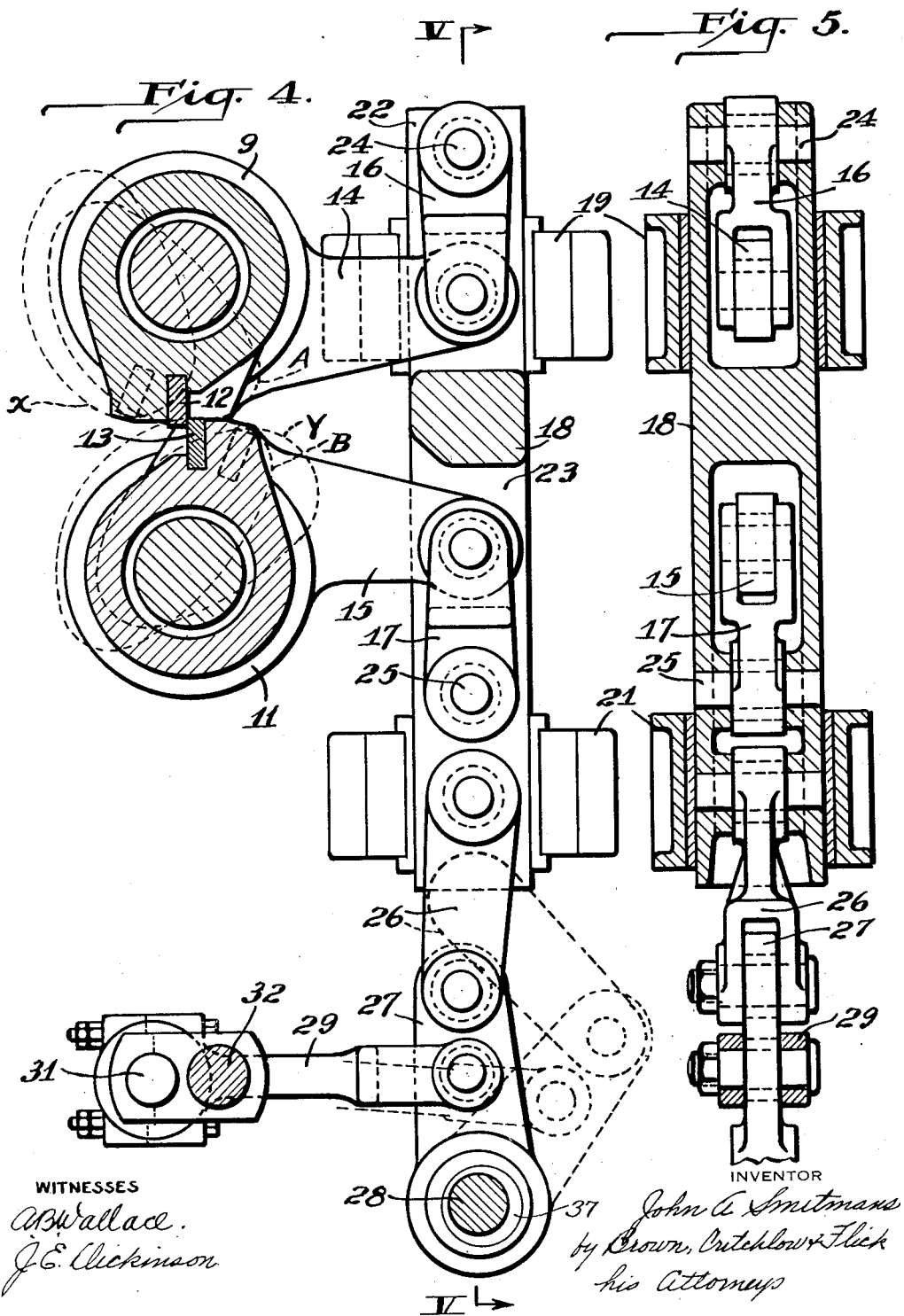

Patented Aug. 7, 1934

1,969,433

UNITED STATES PATENT OFFICE

1,969,433

FLYING SHEAR

John A. Smitmans, Pittsburgh, Pa., assignor to United Engineering & Foundry Company, Pittsburgh, Pa., a corporation of Pennsylvania Application December 7, 1933, Serial No. 701,276

22 Claims. (Cl. 164—66)

This invention, which is a continuation-in-part of the invention disclosed in a United States patent application Serial No. 557,608, filed August 17, 1931, pertains to metal shearing apparatus, and more particularly to flying shears of the type used for cutting sheets, strips, bars and the like into sections of predetermined lengths while the stock is in motion.

The object of the invention generally stated is to provide a shear of this character which is simple and sturdy of construction, dependable in operation, and in which provision is made for so controlling the cooperation of the cutting blades as to positively insure perfect cutting at all times.

Another object is to provide for easily and readily adjusting the relative movement of the cutting blades in such a fashion as to cause or prevent them from producing cuts as they are rotated, and for doing so while the shear is in motion, thus making it possible to vary the length of the cuts without varying the continuous operation of the apparatus or the movement of the stock.

Figure 1:
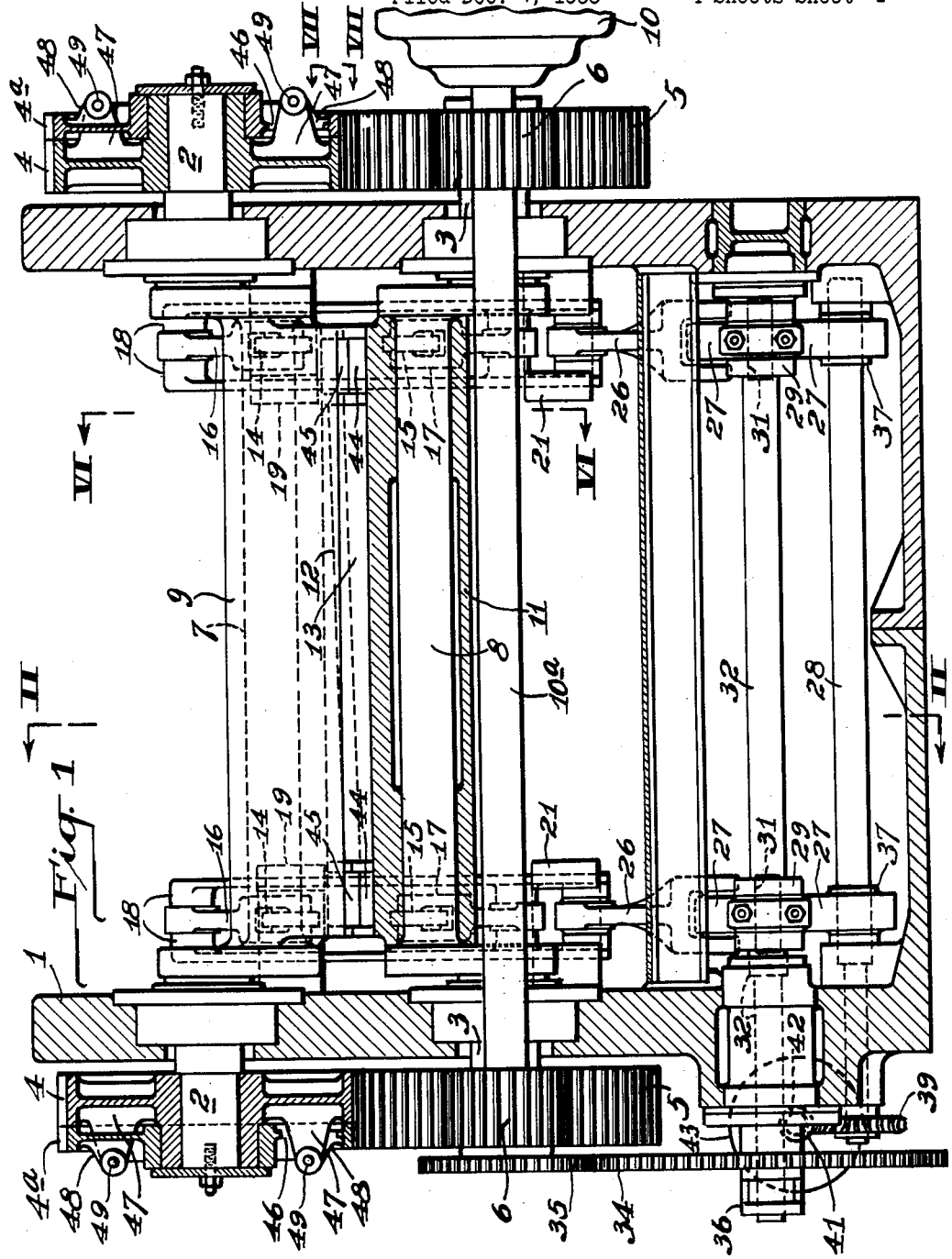
Figure 2:
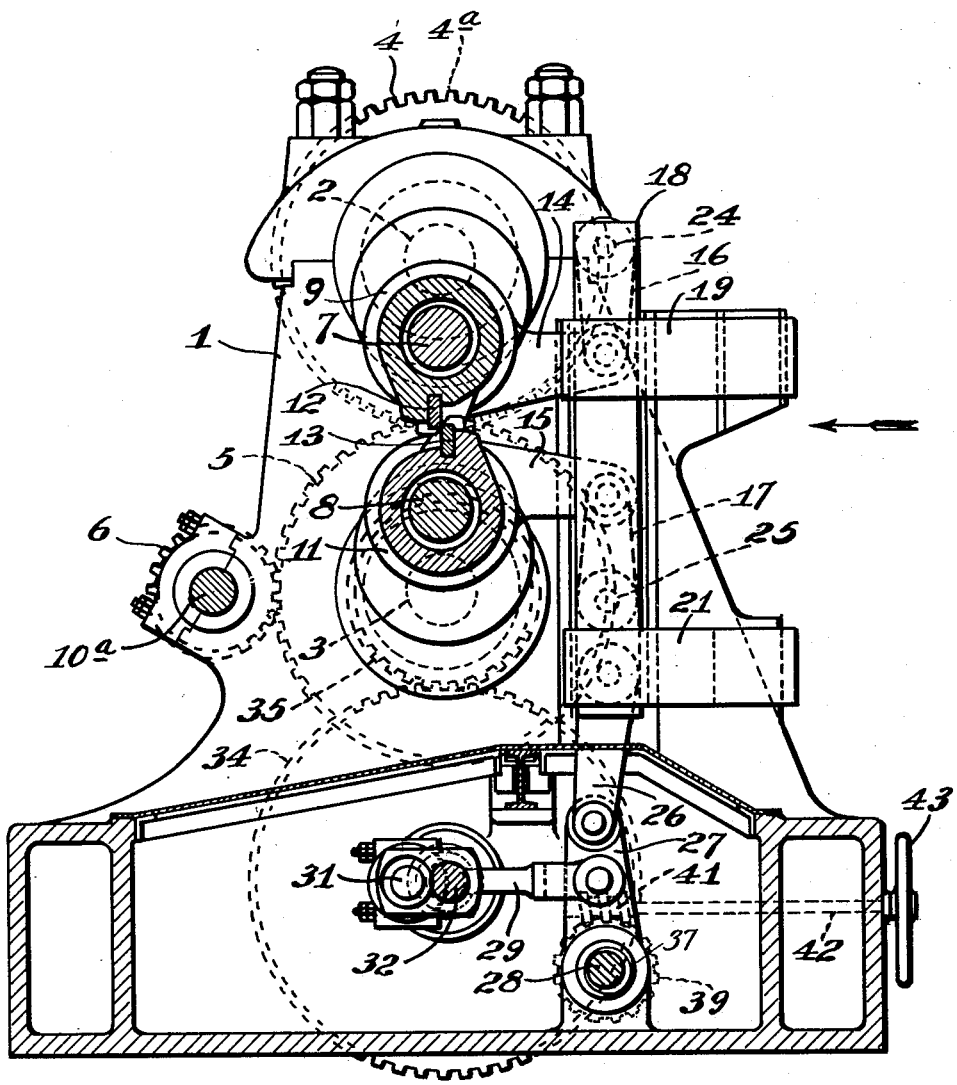

These and various other objects, as well as the various other novel features and advantages of the invention, will be apparent when the following detailed description is read in conjunction with the accompanying drawings, of which Fig. 1 is a vertical section of a flying shear constructed in accordance with the invention; Fig. 2 a vertical section taken on the line II—II of Fig. 1; Fig. 3 an elevational view looking at the driving end of the shear; Fig. 4 a vertical section on an enlarged scale taken through the actuating cranks of the shear, the shear blades and their supports, and the toggle mechanism employed for effecting their adjustment; Fig. 5 a sectional view on the line V—V of Fig. 4; Fig. 6 a sectional view to enlarged scale taken on the line VI—VI of Fig. 1; Fig. 7 an enlarged diagrammatic view looking into the shear along the line VII—VII of Fig. 1; and Fig. 8 a view similar to Fig. 7 illustrating the use of plain gears with the blade heads.

Referring now to the drawings, the numeral 1 designates the housing or supporting frame of the shear, in which there is mounted in suitable bearings a pair of bladehead supporting shafts 2 and 3. These shafts are provided between the upright ends of the housing with a pair of eccentrics 7 and 8 and equipped at their outer ends with cooperating driving gears 4 and 5, which latter are operably connected to be driven by a pair of driving pinions 6 mounted on the drive shaft 10a of a driving motor 10.

On the eccentrics 7 and 8 there is loosely mounted a pair of cutter heads or blade supports 9 and 11 to which the blades 12 and 13 of the shear are rigidly secured. To guide these blades so as to cause them to make or miss cuts as the eccentrics 7 and 8 are rotated, the supports 9 and 11 are provided at their opposite ends with two sets of arms or levers 14 and 15 which are pivotally connected to corresponding sets of connecting links 16 and 17 (Figs. 4 and 5), respectively. These in turn are pivotally connected to a pair of sliding heads 18 mounted for reciprocatory movement in suitable guides 19 and 21 provided on opposite ends of frame 1 adjacent the ends of cranks 7 and 8.

In order to permit the links 16 and 17 to move with the eccentrics 7 and 8 as the latter are rotated, suitable openings 22 and 23 are provided in the heads 18, the openings being such as to permit rocking movement of the connecting links about the pins 24 and 25, respectively, by which they are pivotally attached to the heads. By reason of this arrangement when the heads 18 are held in a particular position, the blade carriers 9 and 11 are prevented from turning with the eccentrics 7 and 8 when the latter are rotated and are guided in their movement so that cutting blades 12 and 13 will either positively make or miss cuts as they move opposite each other.

By adjusting the heads 18 to the position shown in Fig. 4, the blades 12 and 13 are caused to move in the paths indicated by the dotted lines A and B, and due to the guiding action of the arms 14 and 15, together with the links 16 and 17 and the heads 18, their cutting edges are caused to travel in a plane passing through the centers of the eccentrics 7 and 8 and the centers of the shafts 2 and 3. Consequently, when so operated they will produce a cut at an instant when the shock of engagement with the material will least interfere with the operation of the apparatus and when the blades are moving in the line of travel of the stock, and also when they are disposed at right angles thereto.

By moving the pins 24 and 25 to a different position the blade heads controlled thereby are caused to move at different angular relations with respect to their supporting cranks, with the result that the blades carried thereby are thus prevented from moving into cutting opposition when the eccentrics are operated to their normal cutting position. This is illustrated by the dotted line showing of the moving elements in Fig. 4 where both pins 24 and 25, in accordance with the embodiment of the invention illustrated here, are moved downwardly with the slide heads 18. With such adjustment the blades follow the paths X and Y as the eccentrics 7 and 8 are rotated, and at no time in their travel do they move into cutting engagement with each other or intersect the path of travel of the strip passing through the shear. Consequently, they are thus prevented from either producing cuts or marking the stock. The only requirement of such adjustment for missing cuts is that the adjustment be sufficient to cause the blades to entirely miss the strip as the eccentrics are rotated.

For moving the slide heads 18 so as to cause the blades to miss or make cuts as they are actuated, a pair of connecting links 26 is pivotally attached to their lower ends, and these in turn are pivotally connected at their lower ends to the upper ends of a pair of links 27 mounted on a shaft 28 suitably supported in the base of frame 1. To the center of these latter links 27 a pair of pitmen 29 is pivotally connected, and these in turn are connected to cranks 31 mounted on a shaft 32 also supported in the frame 1, as shown in Figs. 1 and 2. This latter shaft is equipped at one end with a loosely mounted gear 34 which is arranged to mesh with a gear 35 mounted on the end of shaft 3. To rotate the shaft 32 so as to move the heads 18 into and out of cutting position a jaw clutch 36 is provided on the end of shaft 32 and adapted to engage the gear 34 with the latter shaft.

In order that the pitmen 29 may be actuated in synchronism with the eccentrics 7 and 8, which is necessary, as is obvious, for the proper operation of the shear, the gears 34 and 35 are designed to drive the shaft 32 at a speed which is an even multiple of the speed of the eccentrics. Consequently, when the clutch 36 is engaged the cutting blades are brought into cutting opposition with each other at regular intervals, such intervals being determined by the ratio of the gear 34 to the gear 35, and, as will be appreciated, this ratio may be changed if desired to vary the length of the cuts.

If it is desired to produce a cut with each rotation of the eccentrics, the slide heads 18 are adjusted to the position shown in full line in Fig. 3, and the clutch 36 then disengaged. On the other hand, if it is desired to cause them to miss cuts for a certain number of revolutions and to continue such operation without stopping, the proper gear ratios between gears 34 and 35 are provided and the clutch 36 engaged continuously.

To provide for adjusting the guiding mechanism of the cutting blades so that proper cutting contact of the blades may be maintained at all times in spite of any wear or distortion which may occur in such mechanism, the links 27 are eccentrically connected at 37 to the normally stationary shaft 28 which is adapted to be turned to incrementally adjust the displacement of the slide heads 18 effected by the pitmen 29. To turn this shaft it is provided at one end with a worm wheel 39, and with this a worm 41 is meshed which is mounted on shaft 42 extended to the front of the housing 1 and provided with hand wheel 43.

To positively prevent the blades 12 and 13 from overlapping or jamming when they are moved together, a pair of guides 44 and 45, as shown in section in Fig. 6, is mounted on the ends of the blade heads 9 and 11 at the ends of the cutting blades. These guides comprise J-shaped members which are mounted in back-to-back relation and provided with rounded adjacent corners which function to deflect the blades in case they tend to overlap and cause them to pass each other under such circumstances in close surface-to-surface contact. The vertically disposed portions of these guides are disposed in alignment with the body of the blades and constitute in a sense an extension on the blade ends. Their curved portions as stated above project above and away from the contacting edges of the blades so that as the blades are moved together if there is any overlapping, these portions of the cams engage each other in advance of the blades and function in the manner of wedges to positively prevent the blades jamming and insuring their being moved into proper cutting opposition.

To further improve the operation of the shear, one or both of each pair of the blade-head actuating gears 4 and 5 are provided with a split gear section which is so constituted as to eliminate play between the gears and also spreading of the blades when a cut is made. In the present embodiment of the invention only the upper gears 4 are equipped with split gear sections 4a. These as shown best in Figs. 1 and 3 are mounted loosely upon the hubs of the gears 4 and provided with spaced openings 46 in their webs through which bosses 47 provided on the webs of the gears 4 are projected. Opposite these bosses similar bosses 48 are provided on the split sections 4a at one end of each opening 46.

Through the bosses associated with each opening 46 there is extended a bolt 49 which is equipped at its outer end with a bolt 51. Between this bolt and the boss 47 there is arranged a coil spring 52. These springs are so flexed that they displace the teeth on the split sections 4a with respect to those on the gears 4 in such a fashion as shown in Fig. 7 that the openings between the teeth on the gears 5 are completely filled by the teeth on the two sections of gears 4, and hence resiliently prevent play between the gears 4 and 5 which normally occurs between cooperating gears. With such adjustment these springs also prevent the cutting blades from spreading in the manner indicated in Fig. 8 when a cut is made, as they do when ordinary gears are used. To further aid in overcoming the tendency of the blades to separate when a cut is being made, which is obviously very undesirable and which is a fault of most shears used in cutting especially thin material, the driving force applied to the gears 4 and 5 in accordance with the invention is applied to the lower gears 5. Hence such force is also adapted to oppose the tendency of the material to separate the cutting blades.

In operation the eccentrics 37 are preferably so adjusted that the guides 44 and 45 will take up all the play in the guiding mechanism when a cut is made and insure the cutting blades moving in proper cutting alignment and the split gears 4a so adjusted as to eliminate any play in the gears 4 and 5 between cuts.

A further feature of the shear which is made possible by reason of the blades being kept in parallel alignment and also moved at the speed of the stock when a cut is being made is that at least one of the blades, and in the present embodiment both of them, are mounted in a raked fashion and provided with tapered cutting edges which adapt them to produce cuts with a minimum amount of force and materially reduces the shocks normally encountered in such shears.

The foregoing, as well as the numerous other advantages of a shear constructed in accordance with this invention, will be apparent to those skilled in the art, and obviously it may be employed in structures other than that illustrated in the accompanying drawings. Consequently, such construction is not intended to constitute a limitation of the invention as defined in the appended claims.

According to the provisions of the Patent Statutes, I have explained the principle and operation of my invention, and have illustrated and described what I now consider to represent its best embodiment. However, I desire to have it understood that, within the scope of the appended claims, the invention may be practiced otherwise than as specifically illustrated and described.

I claim:

1. In a shear for cutting moving material, a pair of blade carriers equipped with cooperating cutting blades adapted to move one over the other to produce a shearing cut, means for so moving said carriers as to cause said blades to intersect and cut the material while traveling in the direction of the material, and auxiliary means for so guiding said carriers as to insure the proper cutting cooperation of said blades.

2. In a shear for cutting moving material, a pair of blade carriers equipped with cooperating cutting blades, means for so moving said carriers as to cause said blades to intersect the material while traveling in the same direction as the material, and means mounted on said carriers for preventing the cutting blades from jamming when they are moved together.

3. In a shear for cutting moving material, a pair of blade carriers equipped with cooperating cutting blades, means for so moving said carriers as to cause said blades to intersect the material while traveling in the same direction as the material, and means for incrementally adjusting the movement of said carriers in such a fashion as to prevent the cutting blades from spreading when passing through the material.

4. In a shear for cutting moving material, a pair of blade carriers equipped with cooperating cutting blades, means for so moving said carriers as to cause said blades to intersect the material while traveling in the same direction as the material, means for incrementally adjusting the movement of said carriers in such a fashion as to prevent the cutting blades from spreading when passing through the material, and means for preventing the blades from jamming when they are moved together.

5. In a shear for cutting moving material, a pair of blade carriers equipped with cooperating cutting blades, means for so moving said carriers as to cause them to intersect the material while traveling in the same direction as the material, and cam means mounted adjacent the ends of said cutting blades for taking up any play which may occur in said actuating means and also maintaining said cutting blades in proper cutting relation when cutting.

6. In a shear for cutting moving material, a pair of blade carriers equipped with cooperating cutting blades, means for so moving said carriers as to cause them to intersect the material while traveling in the same direction as the material, resilient means tending to overlap the blades, and means for preventing them from overlapping or getting out of alignment when they are producing a cut.

7. In a shear for cutting moving material, a pair of blade carriers equipped with cooperating cutting blades, means for so moving said carriers as to cause them to intersect the material while traveling in the same direction as the material, incremently adjustable means for causing said blades to tend to overlap when they are moved together, and means for preventing any such overlapping and also insuring the blades being maintained in proper alignment when producing a cut.

8. In a shear for cutting moving material, a pair of blade carriers equipped with cooperating cutting blades, means for normally so producing a relative movement of said carriers as to cause said blades to move toward each other while traveling in the same direction as the material without effecting shearing of the material, means for producing a modification of said movement to cause said blades to produce cuts, and incremently adjustable means for preventing said cutting blades from spreading when engaging the material.

9. In a shear for cutting moving material, a pair of blade carriers equipped with cooperating cutting blades, means for normally so producing a relative movement of said carriers as to cause said blades to move toward each other while traveling in the same direction as the material without effecting shearing of the material, means for producing a modification of said movement to cause said blades to produce cuts, incrementally adjustable means for preventing said cutting blades from spreading when engaging the material, and means cooperating with said last-mentioned means for preventing said blades from fouling each other when they are moved together.

10. A flying shear comprising a supporting frame, a pair of eccentrics rotatably mounted in said frame, a pair of blade heads equipped with cooperating blades loosely mounted on said eccentrics, means for controlling the movement of said heads with respect to said eccentrics to guide said cutting blades in their cutting operations, and means for incrementally adjusting said last-mentioned means to insure the proper cutting cooperation of said blades at all times.

11. A flying shear comprising a supporting frame, a pair of power driven crank shafts rotatably mounted in said frame, a pair of blade heads equipped with cooperating blades loosely mounted on said shafts, flexible means connecting said heads to said frame for controlling the movement of said heads on said shafts as said cranks are rotated, and means for adjusting said connections to cause or prevent said blades making cutting engagement with each other as said cranks are rotated.

12. A flying shear comprising a supporting frame, a pair of crank shafts rotatably mounted in said frame, a pair of blade heads equipped with cutting blades loosely mounted in said shafts, a control crank rigidly mounted on each of said heads, a slide head reciprocably mounted in said frame, connecting links pivotally connecting said control cranks with said slide head, and means for adjusting said slide heads to cause or prevent said blades making cutting engagement as said crank shafts are rotated.

13. A flying shear comprising a supporting frame, a pair of crank shafts rotatably mounted in said frame, a pair of blade heads equipped with cutting blades loosely mounted on said shafts, a control crank rigidly connected to each of said heads, a slide head reciprocably mounted in said frame, a link connection pivotally connecting said control cranks to said slide head, means driven in synchronism with said crank shafts for moving said slide head to thereby adjust said blade heads to cause said blades to intermittently miss cuts.

14. A flying shear comprising a supporting frame, a pair of crank shafts rotatably mounted in said frame, a pair of blade heads equipped with cooperating cutting blades loosely mounted on said shafts, flexible means for controlling the movement of said heads, means for adjusting said flexible means to cause said blades to miss or make cuts as they are rotated, and means for making increment adjustments to said flexible connection to insure proper cooperation of said blades.

15. A flying shear comprising a supporting frame, a pair of crank shafts rotatably mounted in said frame, a pair of blade heads equipped with cooperating cutting blades loosely mounted on said shafts, flexible means for controlling the movement of said blade heads as said blade heads are rotated, adjustable means operable in a manner to cause said blades to make or miss cuts when said crank shafts are rotated, a pitman arranged to activate said adjusting means to and from its blade missing and cutting positions, and means driven in synchronism with said crank shafts for operating said pitman and a clutch for connecting said latter means to said pitman.

16. A flying shear comprising a supporting frame, a pair of cutter-supporting crank shafts mounted in said frame, a pair of blade heads equipped with cutting blades loosely mounted on the cranks of said shafts, a pair of rigid levers coupled to said blade heads, and means for adjusting the free ends of said levers to cause or prevent said blades moving into cutting engagement with each other as said crank shafts are rotated.

17. A flying shear comprising a supporting frame, a pair of power driven cutter-supporting crank shafts mounted in parallel relation in said frame, a pair of blade heads equipped with cutting blades loosely mounted on the cranks of said shafts, a pair of levers connected to said heads for preventing their rotating on said cranks, and means driven in synchronism with said crank shafts flexibly connected to the ends of said levers for controlling the cutting operation of said blades as said crank shafts are rotated.

18. In a flying shear, a pair of cutter-supporting crank shafts mounted in parallel relation, a pair of blade heads loosely mounted on the cranks of said shafts, a pair of blades mounted on said heads and adapted to make cutting engagement with each other in a plane passing through the centers of said crank shafts, and means for angularly adjusting said heads on said crank to cause them to make or miss cuts as said crank shafts are rotated.

19. A flying shear comprising a supporting frame, a pair of crank shafts rotatably mounted in said frame, a pair of blade heads equipped with cutting blades loosely mounted for cooperative operation on said shafts, a pair of levers connected to said heads for guiding said blades in their cutting operations, and link means pivotally connected between said frame and the free ends of said levers.

20. A flying shear comprising a supporting frame, a pair of crank shafts rotatably mounted in said frame, a pair of blade heads equipped with cutting blades adjustably connected to said crank shaft, a pair of guiding levers connected to said blade heads for guiding the movement of said heads in their cutting operation, link means connected between said frame and the free ends of said levers, and means for incremently adjusting the frame ends of said links to thereby adjust the cutting engagement of the cutting blades.

21. In a shear for cutting moving material, a pair of blade carriers equipped with cooperating cutting blades, driving means for so moving said carriers as to cause said blades to intersect the material and produce a shearing cut while traveling in the same direction as the material, resilient means tending to overlap said blades when they are moved together and means comprising a part of said driving means for positively determining the relative positions of said blades when producing a cut.

22. In a shear for cutting moving material, a pair of blade carriers equipped with cutting blades, a pair of meshed gears having the usual gear tolerance connected to said carriers to insure their moving in synchronism, means for supplying power to drive said carriers and move said cutting blades to produce cuts while traveling with the material, and an auxiliary gear resiliently connected to one of said carrier gears in a manner to automatically take up the play between the teeth of said gears and prevent spreading of the cutting blades when producing a cut, the carrier gears themselves being so mounted as to prevent overlapping of the blades.

JOHN A. SMITMANS.